June 29, 1948.  A. C. GRANT  2,444,097
FLANGE SPREADER
Filed Oct. 13, 1945
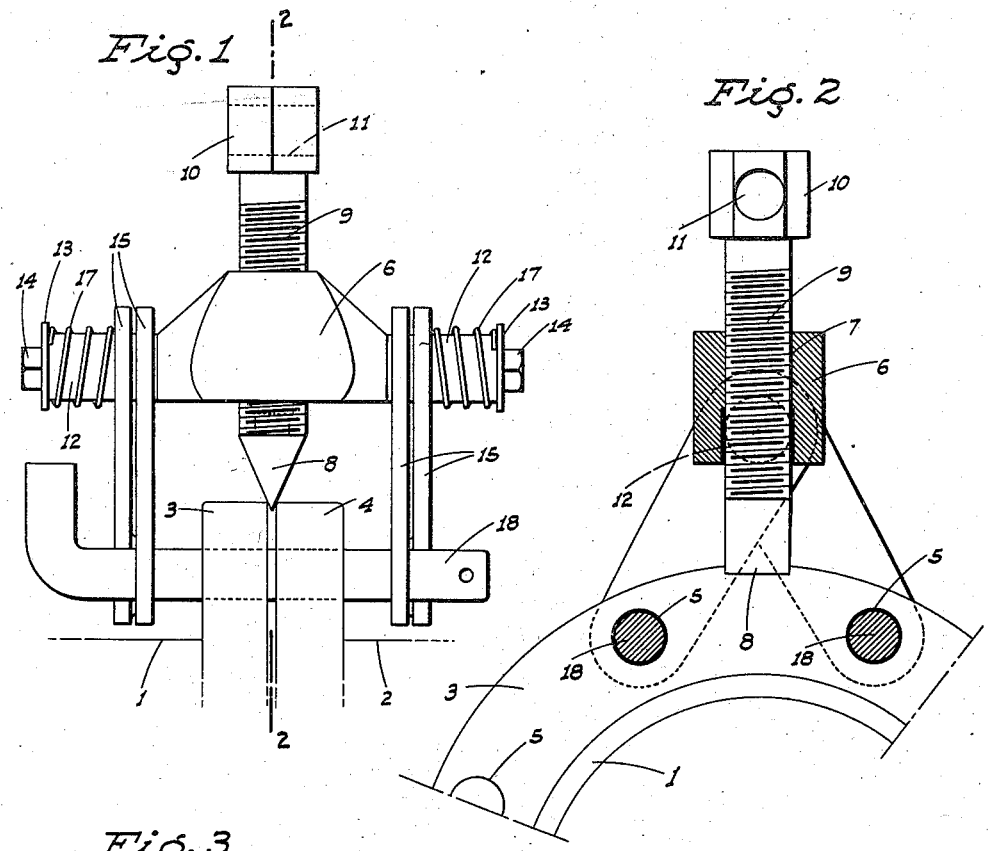
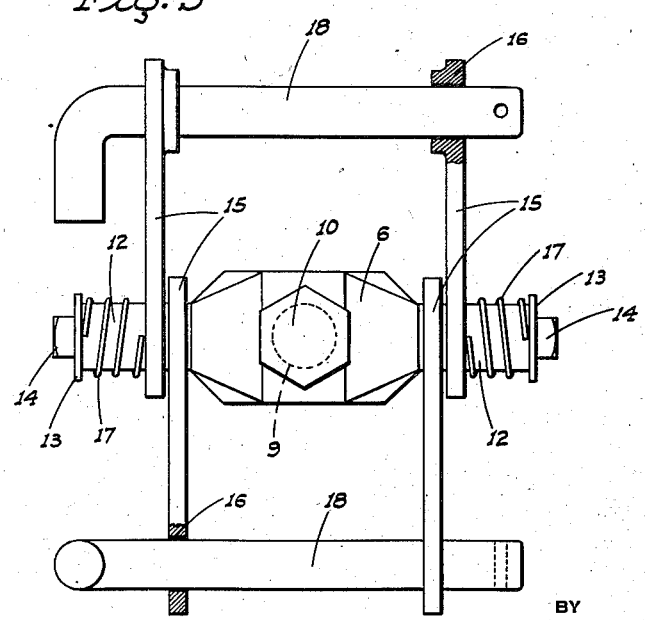
INVENTOR
Allan C. Grant
BY
ATTORNEYS Patented June 29, 1948

2,444,097

UNITED STATES PATENT OFFICE 2,444,097

FLANGE SPREADER

Allan C. Grant, Tracy, Calif.

Application October 13, 1945, Serial No. 622,118

5 Claims. (Cl. 254—100)

This invention relates to improvements in devices for spreading flanges, and is particularly directed to a device for spreading apart the flanges on flanged pipe.

It is usual in that type of piping which is connected by flanges at the adjacent ends of the pipe that gaskets are interposed in order to make a tight joint, and very often it is required that these gaskets be changed. After the flanges have been bolted together with the gasket between them for a period of time the gasket tends to closely adhere to the front surfaces of the adjacent flanges, and quite frequently—especially in connection with large size pipe—it is very difficult to spread the flanges apart in order to remove the old flange and replace it with the new.

The primary object of this invention, therefore, is to provide a simple spreading tool for this purpose which may be initially mounted in fixed position relative to the opposed flanges, and then while held in position operated in a simple and effective manner to spread the flanges apart to the desired degree.

These objects are accomplished by means of such structure and relative arrangement of parts as will fully appear by a perusal of the following specification and claims.

In the drawings similar characters of reference indicate corresponding parts in the several views;

Figure 1 is a side elevation of my improved spreader showing it as mounted on the opposed flanges ready for the performance of the spreading action.

Figure 2 is a sectional view on line 2—2 of Fig. 1.

Figure 3 is a top plan view of the tool showing the parts spread apart in order to more clearly indicate their relative position and mode of operation.

Referring now more particularly to the characters of reference on the drawings, the numerals 1 and 2 designate the outlines of the pipe on which are mounted the flanges 3 and 4 which, in practice, are mounted in face to face relation and bolted together through the medium of bolts placed through alined orifices 5 in the adjacent flanges.

My improved tool comprises a body 6 which is centrally threaded, as at 7.

The numeral 8 designates the spreader element, which is preferably a chisel-pointed structure, swivelly mounted on the lower end of a threaded shank 9 which projects in threaded relation through the threaded portion 7 of the body 6. At the outer end the shank 9 is provided with a means for turning said shank, which may be of any desired handle form, but in the disclosure here shown is indicated as a bolt head 10 having an orifice 11 through which a turning handle rod may be inserted.

Projecting to each side of the body 6 is a pintle 12 each provided with an end flange 13, which may be removably mounted thereon by a bolt 14. Pendulantly mounted on each pintle 12 is a pair of links 15 of equal length, and each link being provided in its outer end with an orifice 16, which orifices come into alinement when the links are disposed in parallel relation. A small yielding spring 17 is mounted on each pintle 12 between the link 15 and the flange 13, so that the pair of links on each pintle may be moved along the pintle to spread the pairs of links apart relative to each other as may be desired. Pins 18 are provided and are of a size and length that one of them may be projected through the orifice in the link on one pintle to and through an alined orifice in the link on the opposite pintle.

In practice, when it is desired to spread the flanges 3 and 4 the connecting bolts are removed from the orifices 5 and a link from each pintle 12 is then moved into alinement with a pair of alined orifices 5, and a pin 18 is then projected through the alined orifices in the links and flanges. The other two links on their respective pintles are then spread in a manner to be likewise brought into position to have their orifices alined with another set of orifices 5 in the flanges, and another pin 18 is projetced therethrough. This arrangement is shown quite clearly in Fig. 2. When the links are thus tied to the flanges through the medium of the pins 18 the body 6 is supported substantially in alinement with the contacting flanges and by shifting the same to one side or the other the spreader point 8 may be brought into direct alinement with such space. Through the operation of the bolt head 10 the shank 9 is advanced through the body, forcing the spreader point in between the flanges and spreading them apart, the flanges during this operation being free to slide on the pins 18 and the links being free to likewise slide either on the pintles 12 or on the pins 18 to adjust themselves to the spreading action.

It will also be apparent that since the links 15 are pendulantly hung on the pintles 12 and may readily slide along the pintles against the light pressure of the yielding springs 17, the tool may be adapted for use on flanges of different widths and thicknesses.

From the foregoing description it will be readily apparent that I have produced a very simple tool which is adapted for use on flanged pipes of all sizes for readily spreading apart the opposed faces of the flanges, and which can be very easily and quickly mounted for the spreading action and as quickly demounted after the spreading action has been accomplished.

Having thus described the invention, the following is claimed as new and useful and upon which Letters Patent are desired:

1. A spreader comprising a threaded body, a spreader point having a shank mounted in threaded relation through the threaded portion of the body, pintles projecting laterally out from opposite sides of the body, and a pair of loosely hung links mounted on each pintle, said links being provided with alined orifices in their outer ends and pins adapted to be projected through said orifices.

2. A device as in claim 1, including flanges on the ends of the pintles and readily yieldable springs mounted on the pintles and interposed between the links and flanges.

3. A flange spreader comprising a threaded body, a spreader point having a shank mounted in threaded relation through the body, pintles projecting laterally out from opposite sides of the body, a pair of links loosely hung on each pintle for swinging movement about such pintle as an axis, each link being provided with a transverse orifice in its outer end, the orifices in the links being arranged to aline with each other when the links are brought into parallel relation, and pins adapted to be projected through pairs of alined link orifices.

4. A spreader as in claim 3 in which the links are slidably mounted along the length of the pintles.

5. A spreader as in claim 4 including yieldable means to normally hold the links against sliding movement on the pintles.

ALLAN C. GRANT.

REFERENCES CITED

The following references are of record in the file of this patent:

UNITED STATES PATENTS

| Number | Name | Date |
|---|---|---|
| 2,213,227 | Persson | Sept. 3, 1940 |
| 2,352,290 | Saul et al. | June 27, 1944 |
| 2,353,623 | Saul | July 11, 1944 |
| 2,393,795 | Miller | Jan. 29, 1946 |